(12) United States Patent
Serdiuk

(10) Patent No.: US 6,916,031 B1
(45) Date of Patent: Jul. 12, 2005

(54) FRICTIONLESS BICYCLE STOPPING DEVICE

(76) Inventor: Gregory Serdiuk, 1500 Parkside La., LaGrange, IL (US) 60189-4468

( * ) Notice: Subject to any disclaimer, the term of this patent is extended or adjusted under 35 U.S.C. 154(b) by 0 days.

(21) Appl. No.: 10/667,934

(22) Filed: Sep. 22, 2003

Related U.S. Application Data

(63) Continuation-in-part of application No. 10/057,267, filed on Jan. 24, 2002, now abandoned.

(51) Int. Cl.⁷ .............................................. B62M 9/04
(52) U.S. Cl. ..................................... 280/237; 280/236
(58) Field of Search .............................. 280/236, 237, 280/238, 252, 253, 259–261

(56) References Cited

U.S. PATENT DOCUMENTS

| | | | | |
|---|---|---|---|---|
| 4,093,261 A | * | 6/1978 | Persson | 280/241 |
| 4,583,754 A | * | 4/1986 | Seeliger | 280/246 |
| 4,702,486 A | * | 10/1987 | Tsuchie | 280/255 |
| 4,925,201 A | * | 5/1990 | Leonard | 280/238 |
| 5,337,861 A | * | 8/1994 | Romano | 188/24.17 |
| 5,435,583 A | * | 7/1995 | Foster, Jr. | 280/237 |
| 5,765,847 A | * | 6/1998 | Toronto et al. | 280/237 |
| 5,884,927 A | * | 3/1999 | Mahaney et al. | 280/237 |
| 5,904,362 A | * | 5/1999 | Yoo | 280/237 |
| 5,918,894 A | * | 7/1999 | Toronto et al. | 280/237 |
| 6,390,487 B1 | * | 5/2002 | Yoo | 280/237 |

\* cited by examiner

*Primary Examiner*—Lesley D. Morris
*Assistant Examiner*—L. Lum
(74) *Attorney, Agent, or Firm*—Robert L. Marsh

(57) ABSTRACT

A bicycle braking device includes a second drive assembly between the crankshaft and the rear axle of the bicycle. The second drive assembly includes a chain drive and pair of engaged gears for reversing the direction of rotation of the crankshaft with respect to the rear axle when the second drive is engaged. The device further includes a clutch for selectively engaging or disengaging the assembly. When the bicycle is moving forward and the second drive is engaged, the pedals will rotate in reverse of the direction of rotation required to propel the bicycle forward. A bicycle rider can apply force through his feet and legs against the rotating pedals to thereby slow and stop a moving bicycle.

9 Claims, 4 Drawing Sheets

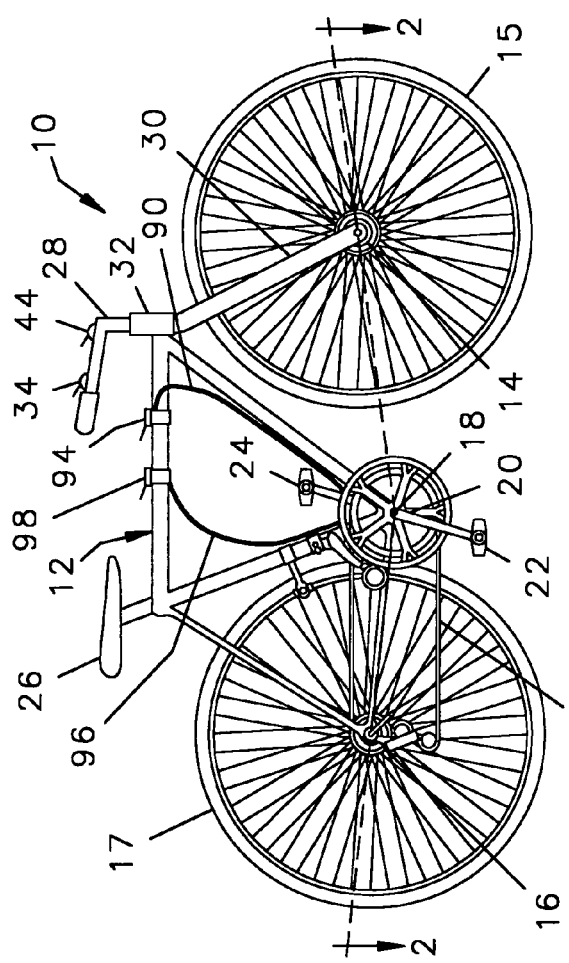
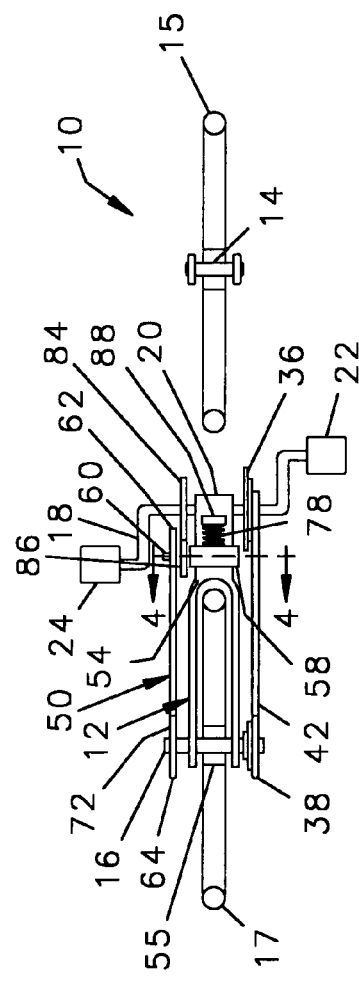
FIG. 1
FIG. 2

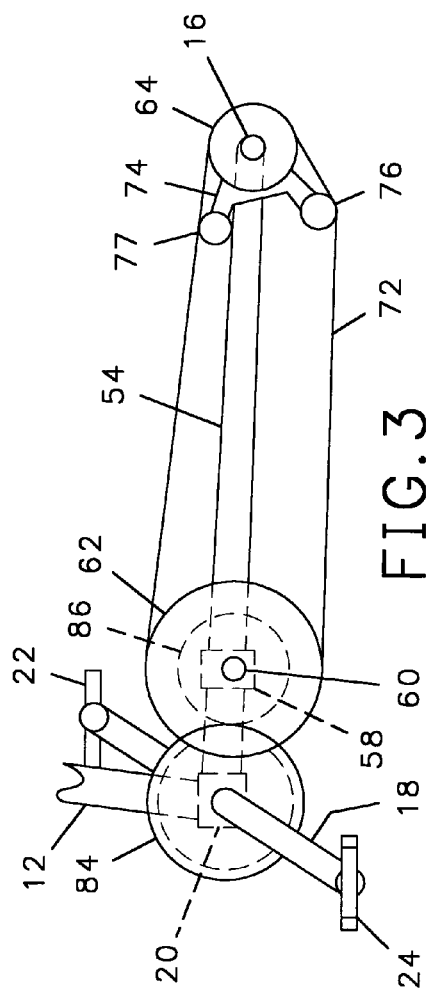
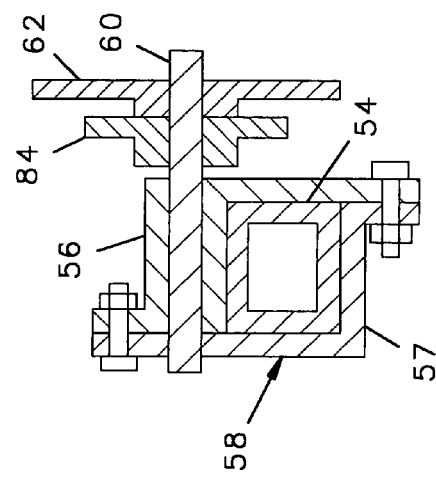
FIG. 3
FIG. 4

FRICTIONLESS BICYCLE STOPPING DEVICE

This is a continuation-in-part of my application filed Jan. 24, 2002 now abandoned and assigned Ser. No. 10/057,267. The present invention relates to bicycles and, in particular, to an improved method and apparatus for slowing and stopping a bicycle without employing friction type brakes.

BACKGROUND OF THE INVENTION

The rider of a bicycle is capable of riding it at substantial speeds. To ride safely, however, a rider must be able to slow and stop his bicycle to prevent injury to himself and to others. There are presently only two commonly used structural systems for slowing and stopping a bicycle, friction brakes and coaster brakes. Coaster brakes are themselves a friction brake, employing friction between two surfaces in the rear axle of a chain driven two-wheeled bicycle. When the pedals of the bicycle are rotated in a forward direction the gearing applies rotational force to the wheel, but when the pedals are driven in the reverse direction, the rear wheel is locked against rotation with respect to the bicycle frame.

Coaster brakes are useable on a bicycle with a chain drive which can apply force through the chain during both forward rotation and rearward rotation. Modern bicycles, however, provide the rider with a multiplicity of gear ratios so the rider can apply his muscles with the most efficient effect. The changing of the gear ratios is accomplished by either a changing of the gearing in the axle of the bicycle, or by changing of the ratios of the diameters of the chain sprockets on the axle and on the foot crank respectively. Coaster brakes are not useable with either type of the presently available multi speed drive systems, and therefor friction brakes have been used on multi speed bicycles. Friction brakes have a caliper mounted on the frame near the outer rim of the wheel and the caliper is controlled by a lever mounted on the handlebars. When the rider actuates the lever, the calipers compress two brake pads around the rim of the wheel causing friction to slow and stop the bicycle.

There are limitations to the control available to a bicycle fitted with friction type brakes. For example, a friction brake that abruptly locks the rotation of the front wheel can flip the bicycle over and cause injury to the rider. It would be desirable, therefore, to provide a method and apparatus for slowing a bicycle without relying on friction. It would also be desirable to provide an alternative method for slowing a bicycle that could be used in conjunction with multi speed drive systems of the type currently available in bicycles.

SUMMARY OF THE INVENTION

Briefly, the present invention is embodied in a bicycle having a frame and front and rear axles with wheels mounted thereon. The bicycle has a crank shaft on the frame with a pair of pedals which are rotatable by a rider's feet, and a chain drive between the crank shaft and the rear axle. The bicycle further has a one-way clutch between the sprocket and the rear axle or on the crank shaft whereby the crank shaft is drivingly engaged with the rear axle for rotation in only the forward direction. The one-way clutch allows the rider to coast during which the wheels of a bicycle rotate, but the crank shaft and pedals remain stationary. The one-way clutch also permits the pedals of such a bicycle to freely rotate in the reverse direction.

In accordance with the invention, a second drive is provided between the crankshaft and the rear axle and a clutch operated by a lever mounted on the handlebars for selectively engaging or disengaging the second drive. The second drive includes a reversing means for reversing the direction of the rotation of the crank with respect to the axle. Accordingly, when the clutch is engaged, the crankshaft is drivingly engaged with the rear axle, but rotates the pedals of the crankshaft in the direction opposite to the direction required to apply a driving force to the rear wheel. With the pedals operatina in reverse rotation, the rider can apply force to the pedals to slow and stop the bicycle.

To provide for the reversing of direction of the crank shaft and peddles, a first gear is mounted on the crank shaft on the opposite side of the bicycle frame from the chain drive. A second gear is mounted co-axially with a braking sprocket on an independent axle and a second chain drivingly connects the braking sprocket with a sprocket on the rear axle. The clutch engages and disengages the second gear with the first gear thereby engaging and disengaging the second chain drive. To slow the bicycle, the rider will actuate the lever to the clutch to engage the second drive. The engagement of the first and second gears reverses the rotation of the first gear with respect to the second, causing the pedals of the crank to be rotated in the reverse direction. When the clutch is engaged, the rider can use his feet and legs to apply force to the rear wheel of a bicycle that uses presently available multi speed drives.

BRIEF DESCRIPTION OF THE DRAWINGS

A better and more complete understanding of the invention will be had after a reading of the following detailed description taken in conjunction with the drawings where:

FIG. 1 is a right side elevational view of a bicycle having a presently available multi speed chain drive;

FIG. 2 is a top view of the bicycle shown in FIG. 1 showing a second chain drive in accordance with one embodiment of the present invention mounted on the side of the bicycle opposite the chain drive;

FIG. 3 is a left side view of the second chain drive shown in FIG. 2 in the engaged orientation;

FIG. 4 is a fragmentary enlarged cross sectional view of the slide and idler shaft of the present invention;

DETAILED DESCRIPTION OF THE PREFERRED EMBODIMENT

Figure 5:
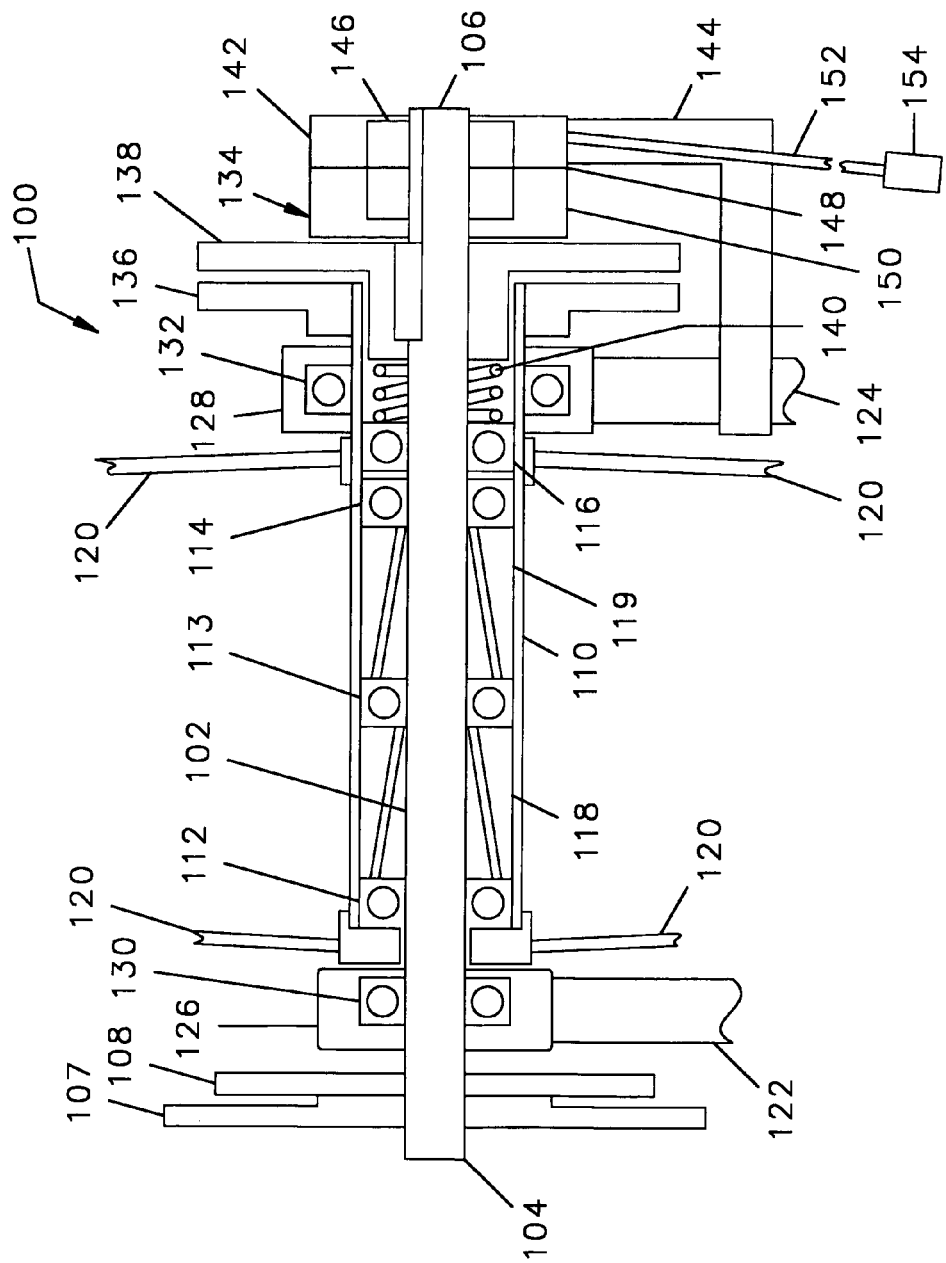
FIG. 5 is a schematic cross sectional view of the rear axle of a bicycle employing a second embodiment of the invention.

Referring to FIG. 1, a typical bicycle 10 has a frame 12 on which is mounted a forward axle 14 with a forward wheel 15 thereon and a rear axle 16 with the rear wheel 17 thereon. Between the front and rear axles 14, 16 is a crankshaft 18 rotatably mounted in a crank case 20, the crankshaft 18 having oppositely directed crank arms with pedals 22, 24 at the distal ends thereof. Above the crankshaft 18 is a seat 26 and forward of the seat are handlebars 28. The handlebars 28 are connected to the front axle 14 by a fork 30 at the upper end of which is a stem, not shown, passing through a sleeve 32 with the handlebars 28 connected to the upper end of the stem such that turning the handlebars 28 will turn the front axle 14. A pair of lever arms, only one of which, 34, is visible, on the handlebars 28 actuate caliper-type friction brakes, not shown.

A first sprocket 36 is attached to the crankshaft 18 and a second sprocket 38 is attached to the rear axle 16. Connecting the first and second sprockets is a chain drive 42 such that pedaling the crank 18 will apply a driving rotatable force to the rear axle 16. A third lever 44 mounted on the handle bars shifts the cranking ratio of the crankshaft 18 to the rear axle 16 to thereby allow a rider to select the optimum ratio between the movement of his legs and the turning of the drive wheel 17. The drive assembly includes a one-way clutch, not shown, such that driving force can be applied from the crankshaft 18 through the chain drive 42 to the rear axle 16 for forward rotation only. The pedals 22, 24 are therefore free to rotation in the reverse, or counter clockwise direction as shown in FIG. 1.

Referring to FIGS. 2, 3, 4, and 6, in accordance with the present invention, the bicycle 10 is fitted with a second chain drive 50 on the opposite side of the frame 12 from the chain drive 42. The second drive 50 is oriented generally parallel to frame member 54 which extends from the crank case 20 to a bearing 55 in which the rear axle 16 is journaled for rotation. The frame member 54 has a rectangular cross section and around the frame member 54 are fitted opposing slide sections 56, 57 are retained together by a pair of bolts 59 and associated nuts 61 to hold the parts on assembled relationship to form a slide assembly 58 which longitudinally moveable along the frame member 54.

Extending horizontally outwardly of the slide assembly 58 is an idler shaft 60 on which is fitted a third sprocket 62. A fourth sprocket 64 is fitted around an extension of the rear axle 16 which projects outward of the bearing 55 on the side opposite the second sprocket 38 and a chain 72 extends around the teeth of the third and fourth sprockets 62, 68, thereby drivingly connecting the rotation of the rear axle 16 to the rotation of the idler shaft 60.

A first gear 84 is mounted for rotation with the crankshaft 18 on the side opposite the first sprocket 36 and a second gear 86 having teeth suitable for engagement with those of the first gear 84 is mounted on idler shaft 60 for rotation with the first sprocket 62.

Pivotally mounted to the frame 12 is an idler member 74 having two idler sprockets 76, 77 thereon, sprocket 76 engaging the lower span of chain 72 and sprocket 77 engaging the upper span of chain 72. The idler member 74 is urged by a spring, not shown, away from the frame 12 to thereby take up excess slack in the chain 72. A spring 78 between a block 88 on the frame 12 and the slide assembly 58 urges the slide assembly 58 towards the rear axle 16 and thereby urging the second gear 86 out of engagement with the first gear 84.

One end of the sheath of a push-pull cable 90 is mounted to the frame member 54 and the other end of the sheath is attached to a lever 94 mounted on the frame 12. The lever arm 94 pulls a cable through the sheath, with the distal end of the cable attached to the slide assembly 58. Actuation of the lever 94 therefore draws the slide assembly 58 away from a first portion, shown in FIG. 6, in which the gears 84, 86 are disengaged from each other, and towards a second position, shown in FIG. 3 in which the second gear 86 is engaged with the first gear 84 and the spring 78 is compressed.

Figure 6:
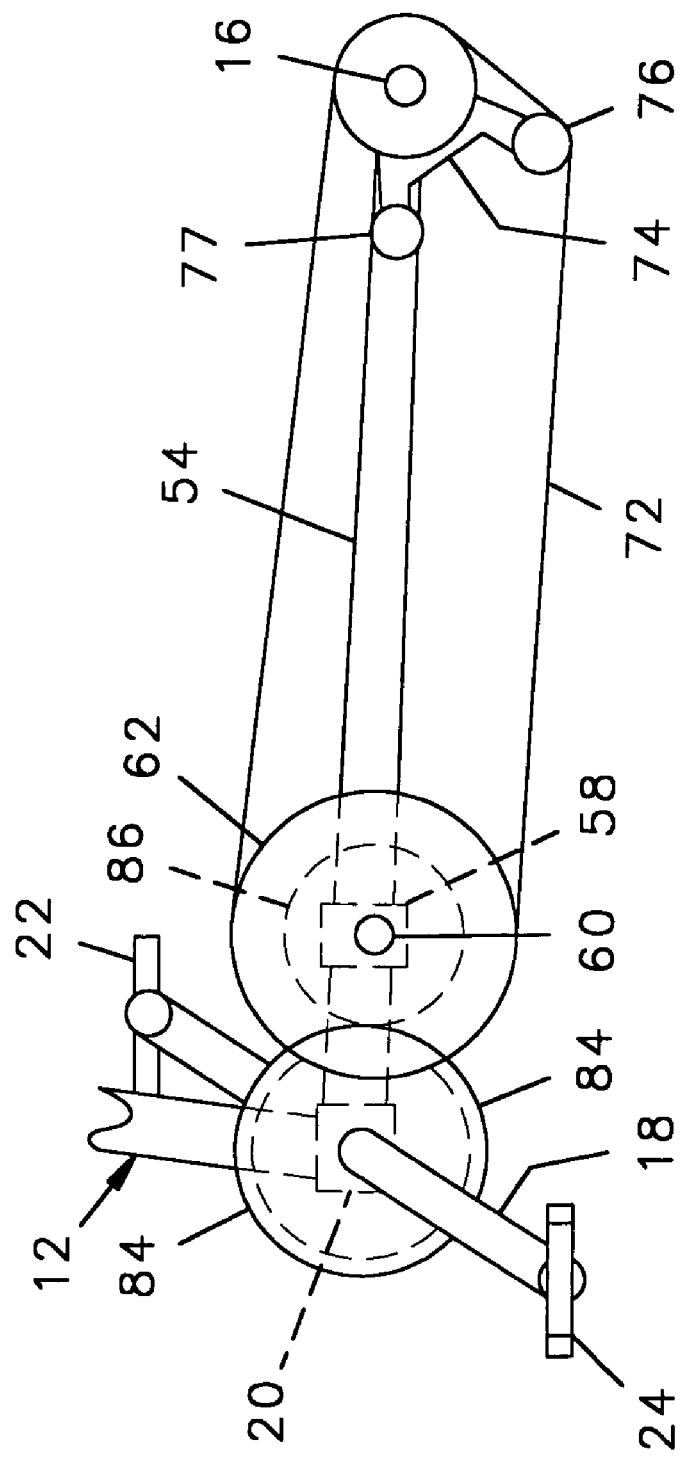
FIG. 6 is a left side view of the second chain drive shown in FIG. 2 in the disengaged orientation.

As can be seen, the third and fourth sprockets 62, 64 and chain 72 will cause the idler shaft 60 to rotate in the same direction as that of the rear axle 16. The idler member 74, and idler sprockets 76, 77 will retain tension on the chain 72 as the spring 78 urges the second gear 86 out of engagement with the teeth of the first gear 84. Accordingly, the rear axle 16 and the crankshaft 18 will not be engaged with each other through the chain 72 while a rider is applying driving force through the chain drive 42 to propel the bicycle 10. When the rider wishes to slow the bicycle, however, the rider will actuate the lever 94 to draw the push pull cable 90 through the sheath and thereby pull the second gear 86 into engagement with the first gear 84. Once the gears 84, 86 are engaged with each other, the second chain drive 50 will connect the crankshaft 18 with the rear axle 16. When the second chain drive 50 is engaged the tension will be on the lower span of the chain, urging the sprocket 77 upward so as to take the slack out of the upper span of the chain 72.

Where the bicycle 10 shown in FIG. 3 and FIG. 6 is moving forward, the wheels will rotate counter clockwise. When the second chain drive 50 is engaged, the crank shaft 18 and pedals 22, 24 thereof, however, will be caused to rotate clockwise because the engagement of gears 84, 86 will reverse their direction of rotation from that of the rear wheel 17. The rider can then apply force to the pedals 22, 24 with his legs and feet to slow and stop the bicycle 10 as needed.

As can be seen, the lever 94 and slide assembly 58 form a clutch whereby the second gear 86 is brought into engagement with the first gear 84 upon actuation of the lever 94. It should be appreciated that there are many structures for a clutch which engages or disengages the second drive 50. The clutch may be positioned on one of the shafts such as the crankshaft 18 or the idler shaft 60. For example, a clutch may engage or disengage the first gear 84 with the crankshaft 18. Alternately, the clutch may engage or disengage the second gear 86 to the idler shaft 60 or engage or disengage the first sprocket 62 to the idler shaft 60.

At higher speeds actuating the lever 94 may cause the pedals 22, 24 of the bicycle 10 to be rotated too rapidly in the reverse direction for the rider to use his legs to apply resistance to the rotation of the wheels. The efficiency of the braking system can be improved by providing a second gearing system for changing the ration of the gearing for the second chain drive 50, the selection of the gearing for the second drive system 50 being controlled through a second push pull cable 96 connected to a fourth lever 98 mounted on the frame 12.

The essential elements of the invention include the clutch and the second drive system 50, where the clutch can selectively engage and disengage the second chain drive system 50. With the clutch 84, 86 engaged the second chain drive will apply rotational force from the rear axle 16 of the bicycle 10 to the crankshaft 18 and the pedals 22, 24. The rider can then use his legs and feet to resist the rotation of the pedals 22,24 and thereby apply a rotational force to the rear axle that is opposite to the direction that causes forward motion, thereby slowing and stopping the bicycle 10.

Referring to FIG. 5, in a second embodiment the chain drive is eliminated. In this embodiment the rear axle 100 of the bicycle includes an inner shaft 102 having a sprocket end 104 and a clutch end 106. A plurality of sprockets, 107, 108 are fixedly attached by a key, not shown, or the like, to the sprocket end 104 for transferring driving power through the chain drive from the pedals, not shown, to the inner shaft 102. A tubular outer shaft 110 surrounds the central portion of the inner shaft and a plurality of bearing 112, 113, 114, 116 retain the two shafts 102, 110 in coaxial relationship while allowing them to rotate independent of one another. A pair of one way clutches 118, 119 transmits rotational power from the inner shaft 102 to the outer shaft 110 in one direction only such that the rider can pump the pedals, not shown, to apply power to the outer shaft 110, or coast with the pedals stationary. The spokes 120 convey the rotational force from the outer shaft 110 to the wheel and tire, not shown.

The axle 100 is retained to the frame members 122, 124 of the bicycle by an axle retainers 126, 128 having bearings 130, 132, respectively, to permit the rotation of the shafts 102, 110. As can be seen, the inner shaft 102 extends through retainer 126 while both inner and outer shafts 102, 110 extend through retainer 128.

At the clutch end 106 of the axle 102 is a clutch 134 having a first clutch plate 136 fixed for rotation with the outer shaft 110 and a second clutch plate 138 fixed for rotation with the inner shaft 102, and the second clutch plate 138 axially moveable with respect to the two shafts 102, 110. A coil spring 140 positioned around the inner shaft 102 and within the outer shaft 110 urges the second clutch plate 138 axially away from the first clutch plate 136.

The clutch 134 further includes a housing 142 which is retained against rotation by an arm 144 attached to frame member 124. A bearing 146 within the housing 142 permits the inner shaft 102 to rotate therein. Within the housing 142 and surrounding the distal end 106 of shaft 102 is an engagement device of the type known in the art, such as an engaged spiral ramped surface, not shown, between adjacent first and second actuation plates 148, 150 with one plate 148 rotatable through an arc with respect to the second plate 150. A push pull cable 152 actuated by a lever 154 rotates the first plate 148 to move with respect to second plate 150, thereby urging the second clutch plate 138 into engagement with the first clutch plate 136.

By actuating the lever 154 on the frame of the bicycle the rider can engage the clutch 134 and thereby lock the inner shaft 102 to the outer shaft 120, causing the two shafts to rotate together. In this case the clutch 134 causes the pedals of the bicycle to rotate in the same rotational direction required to drive the bicycle. The rider can then apply force through his legs to resist the rotation of the pedals to slow and stop the bicycle.

It should also be appreciated that a bicyclist making use of the invention will employ muscles in stopping the bicycle that are not normally used in riding a conventional bicycle, thereby providing certain fitness benefits to the user.

While the present invention has been disclosed with respect to a single embodiment, it will be appreciated that many modifications and variations may be made without departing from the true spirit and scope of the invention. It is, therefore, the intent of appendant claims to cover all such modifications and variations which fall within the true spirit and scope of the invention.

What is claimed is:

1. In a bicycle having a frame, an axle mounted on said frame, a rear wheel mounted on said axle, a crank shaft on said frame, said crank shaft having a pair of pedals wherein said crank shaft can be rotated by the movement of the rider's legs and feet, a chain drive between said crank shaft and said axle, and a one-way clutch wherein said crank shaft is drivingly engaged to said axle for rotation in only one direction, the improvement comprising
    a second drive between said axle and said crank shaft,
    said second drive imparting rotational force from said crank shaft to said axle independent of said chain drive,
    said second drive having reversing means for reversing a direction of rotation of said crank shaft with respect to a direction of rotation of said axle, and
    a manually operable clutch for selectively engaging and disengaging said second drive.

2. The improvement of claim 1 wherein said reversing means further comprises a pair of gears in engagement with each other.

3. The improvement of claim 1 wherein said second drive further comprising an idler shaft, a second chain and first and second sprockets on said idler shaft and on said rear axle respectively.

4. The improvement of claim 3 wherein said second chain drive is positioned on an opposite side of said frame from said chain drive.

5. The improvement of claim 4 wherein said reversing means is a pair of gears in engagement with each other.

6. The improvement of claim 5 wherein said clutch engages and disengages said pair of gears.

7. A bicycle comprising
    a frame,
    a crank shaft on said frame,
    a pair of pedals mounted on ends of said crank shaft,
    a first chain drive for drivingly engaging said crank shaft with said axle,
    one way clutch means on said first chain drive for applying rotational force to said axle in one direction only,
    a second chain drive between said crank shaft and said axle,
    said second chain drive for imparting rotational force from said crank shaft to said axle independent of said first chain drive,
    said second chain drive including reversing means for reversing a direction of rotation of said crank with respect to said axle, and
    manually operable clutch means for selectively engaging and disengaging said second chain drive.

8. In a bicycle having a frame, an axle mounted on said frame, a rear wheel mounted on said axle, a crank shaft on said frame, said crank shaft having a pair of pedals wherein said crank shaft can be rotated by movement of a rider's legs and feet, a chain drive between said crank shaft and said axle, and a one-way clutch wherein said crank shaft is drivingly engaged to said axle for applying rotational force for rotation in only a first direction, the improvement comprising
    means for applying rotational force from said crank shaft urging said axle to rotate in a second direction, and
    a manually operable clutch for selectively engaging and disengaging said means.

9. In a bicycle having a frame, an axle mounted on said frame, a rear wheel mounted on said axle, a crank shaft on said frame, said crank shaft having a pair of pedals wherein said crank shaft can be rotated by the movement of a rider's legs and feet, a chain drive between said crank shaft and said axle, and a one-way clutch wherein said crank shaft is drivingly engaged to said axle for applying rotational force from said crankshaft to said rear wheel in only a first direction wherein rotation of said axle and said rear wheel in said first direction causes forward movement of said bicycle, the improvement comprising
    means for applying rotational force from said rear wheel to said crankshaft while said rear wheel is rotating in said first direction, and
    a manually operable clutch for selectively engaging and disengaging said means.

* * * * *